United States Patent
Sudo et al.

(10) Patent No.: US 9,879,180 B2
(45) Date of Patent: *Jan. 30, 2018

(54) NEMATIC LIQUID CRYSTAL COMPOSITION AND LIQUID CRYSTAL DISPLAY DEVICE USING THE SAME

(71) Applicant: DIC Corporation, Tokyo (JP)

(72) Inventors: Go Sudo, Kita-adachi-gun (JP); Shotaro Kawakami, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/347,459

(22) PCT Filed: Sep. 21, 2012

(86) PCT No.: PCT/JP2012/074198

§ 371 (c)(1),
(2) Date: Mar. 26, 2014

(87) PCT Pub. No.: WO2013/047359

PCT Pub. Date: Apr. 4, 2013

(65) Prior Publication Data

US 2014/0239226 A1 Aug. 28, 2014

(30) Foreign Application Priority Data

Sep. 27, 2011 (JP) .................................. 2011-210671

(51) Int. Cl.

| | | |
|---|---|---|
| *G02F 1/1333* | (2006.01) | |
| *C09K 19/20* | (2006.01) | |
| *C09K 19/30* | (2006.01) | |
| *C09K 19/44* | (2006.01) | |
| *C09K 19/54* | (2006.01) | |
| *C09K 19/04* | (2006.01) | |
| *C09K 19/12* | (2006.01) | |

(52) U.S. Cl.
CPC .......... *C09K 19/20* (2013.01); *C09K 19/3066* (2013.01); *C09K 19/44* (2013.01); *C09K 19/542* (2013.01); *C09K 2019/0448* (2013.01); *C09K 2019/122* (2013.01); *C09K 2019/301* (2013.01); *C09K 2019/3016* (2013.01); *C09K 2019/548* (2013.01)

(58) Field of Classification Search
CPC .. C09K 19/20; C09K 19/3066; C09K 19/542; C09K 19/44; C09K 2019/0448; C09K 2019/122; C09K 2019/301; C09K 2019/3016; C09K 2019/548; G02F 1/1333
USPC .............. 252/299.01, 299.6, 299.63, 299.66; 428/1.1; 349/182
See application file for complete search history.

(56) References Cited

U.S. PATENT DOCUMENTS

| | | | |
|---|---|---|---|
| 7,749,403 B2 | 7/2010 | Satou et al. | |
| 7,767,110 B2 | 8/2010 | Fujita et al. | |
| 7,914,860 B2 | 3/2011 | Fujita et al. | |
| 8,637,125 B2 * | 1/2014 | Goto et al. ..................... | 428/1.1 |
| 8,808,814 B2 | 8/2014 | Matsumura et al. | |
| 8,821,993 B2 | 9/2014 | Hattori et al. | |
| 8,920,674 B2 * | 12/2014 | Yanai et al. ............. | 252/299.63 |
| 9,023,439 B2 * | 5/2015 | Sudou .................... | C09K 19/12 |
| | | | 252/299.5 |
| 2008/0308768 A1 | 12/2008 | Klasen-Memmer et al. | |
| 2009/0032771 A1 | 2/2009 | Saito | |
| 2009/0035630 A1 | 2/2009 | Kumada et al. | |
| 2009/0050843 A1 | 2/2009 | Kawakami et al. | |
| 2009/0065740 A1 | 3/2009 | Hattori et al. | |
| 2009/0090892 A1 | 4/2009 | Fujita et al. | |
| 2009/0109392 A1 | 4/2009 | Hsieh et al. | |
| 2009/0206300 A1 | 8/2009 | Satou et al. | |
| 2009/0324853 A1 | 12/2009 | Bematz et al. | |
| 2012/0145957 A1 | 6/2012 | Saito | |
| 2012/0261614 A1 | 10/2012 | Goto et al. | |

(Continued)

FOREIGN PATENT DOCUMENTS

| | | |
|---|---|---|
| CN | 101323596 A | 12/2008 |
| EP | 0474062 A2 | 3/1992 |

(Continued)

OTHER PUBLICATIONS

International Search Report, dated Nov. 6, 2012, issued in corresponding application No. PCT/JP2012/074198.
International Search Report dated May 15, 2012, issued in corresponding International Application No. PCT/JP2012/059171.
Non-Final Office Action dated Oct. 22, 2015, issued in U.S. Appl. No. 14/517,077 (9 pages).
Takashi, et al "Summary of Development of Nematic Liquid Crystal Composition for Display", Ekisho vol. 1, No. 1, 1997 (14 pages); relevant portion—p. 13, Table 6, No. 12.

(Continued)

*Primary Examiner* — Geraldina Visconti
(74) *Attorney, Agent, or Firm* — Westerman, Hattori, Daniels & Adrian, LLP

(57) ABSTRACT

A liquid crystal composition of the present invention is used for a liquid crystal display device of an active matrix driving mode which is required to have fast response. The liquid crystal composition has negative dielectric anisotropy, a large absolute value thereof, and low viscosity. Also, the liquid crystal composition has excellent liquid crystallinity that does not decrease Δn and $T_{ni}$, and the like, and exhibits a stable liquid crystal phase within a wide temperature range. Further, the liquid crystal composition is chemically stable to heat, light, water, and the like and is thus suitable for use in a liquid crystal display device in which display defects are suppressed in large-size application requiring high reliability. A liquid crystal display device using the liquid crystal composition can be suitably used as a liquid crystal display device of a VA mode or the like.

13 Claims, No Drawings

(56) References Cited

U.S. PATENT DOCUMENTS

| | | |
|---|---|---|
| 2013/0112918 A1 | 5/2013 | Matsumura et al. |
| 2013/0183460 A1 | 7/2013 | Klasen-Memmer et al. |
| 2013/0207039 A1 | 8/2013 | Hattori et al. |
| 2014/0070142 A1* | 3/2014 | Sudo et al. ............. 252/299.63 |
| 2015/0034873 A1* | 2/2015 | Sudo et al. ............. 252/299.63 |

FOREIGN PATENT DOCUMENTS

| | | |
|---|---|---|
| EP | 2695929 A1 | 2/2014 |
| EP | 2700697 A1 | 2/2014 |
| JP | 59-219382 A | 12/1984 |
| JP | 08-104869 A | 4/1996 |
| JP | 2001-354967 A | 12/2001 |
| JP | 2005-314598 A | 11/2005 |
| JP | 2006-037054 A | 2/2006 |
| JP | 2006-233182 A | 9/2006 |
| JP | 2007-039639 A | 2/2007 |
| JP | 2008-505235 A | 2/2008 |
| JP | 2008-144135 A | 6/2008 |
| JP | 2008-308581 A | 12/2008 |
| JP | 2009-035630 A | 2/2009 |
| JP | 2009-40942 A | 2/2009 |
| JP | 2009-270080 A | 11/2009 |
| JP | 2012/097222 A | 5/2012 |
| TW | 200732458 A1 | 9/2007 |
| TW | 201215667 A1 | 4/2012 |
| TW | 201235450 A1 | 9/2012 |
| WO | 2007/077872 A1 | 7/2007 |
| WO | 2010/119779 A1 | 10/2010 |
| WO | 2011/024666 A1 | 3/2011 |
| WO | 2011/158820 A1 | 12/2011 |
| WO | 2012/046590 A1 | 4/2012 |

OTHER PUBLICATIONS

Final Office Action dated Jun. 22, 2016, issued in U.S. Appl. No. 14/517,007 (16 pages).

* cited by examiner

NEMATIC LIQUID CRYSTAL COMPOSITION AND LIQUID CRYSTAL DISPLAY DEVICE USING THE SAME

TECHNICAL FIELD

The present invention relates to a nematic liquid crystal composition useful as a liquid crystal display material and exhibiting a negative value of dielectric anisotropy ($\Delta\in$), and also relates to a liquid crystal display device using the composition.

BACKGROUND ART

Liquid crystal display devices have been used for watches and electronic calculators, various home electric appliances, measuring apparatuses, automotive panels, word processors, electronic notebooks, printers, computers, televisions, etc. Typical examples of a liquid crystal display mode include a TN (twisted nematic) mode, a STN (super twisted nematic) mode, a DS (dynamic light scattering) mode, a GH (guest-host) mode, an IPS (in-plane switching) mode, an OCB (optical compensated bend) mode, an ECB (electrically controlled birefringence) mode, a VA (vertical alignment) mode, a CSH (color super homeotropic) mode, and a FLC (ferromagnetic liquid crystal) mode, and the like. Also, drying methods include static driving, multiplex driving, a simple matrix method, and an active matrix (AM) method of driving by TFT (thin-film transistor), TFD (thin-film diode), or the like.

Among these display modes, the IPS mode, the ECB mode, the VA mode, or the CSH mode has the characteristic of using a liquid crystal material exhibiting a negative value of $\Delta\in$. In particular, the VA display mode driven by AM driving is used for display devices, for example, a television and the like, which are required to have a high speed and a wide viewing angle.

Nematic liquid crystal compositions used for the VA display mode and the like are required to have low-voltage driving, fast response, and a wide operating temperature range. That is, the liquid crystal compositions are required to have a large absolute value of negative $\Delta\in$, low viscosity, and a high nematic-isotropic liquid phase transition temperature ($T_{ni}$). Also, in view of setting of $\Delta n \times d$ which is the product of refractive index anisotropy ($\Delta n$) and a cell gap (d), it is necessary to adjust $\Delta n$ of a liquid crystal composition within a proper range according to the cell gap. In addition, when a liquid crystal display device is applied to a television or the like, fast response is regarded as important, and thus a liquid crystal composition having low viscosity ($\eta$) is required.

The characteristics of liquid crystal compositions have been improved by studying various compounds having negative $\Delta\in$ and a large absolute value thereof.

A liquid crystal composition containing a compound represented by formula (A) and a compound represented by formula (B) is disclosed as a liquid crystal composition having negative $\Delta\in$ (refer to Patent Literature 1).

[Chem. 1]

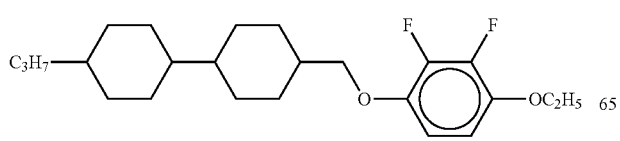
(A)

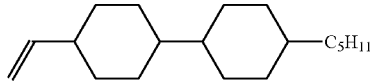
(B)

The liquid crystal composition is intended to attain faster response by adding a compound (alkenyl compound) having an alkenyl group in its molecule, such as a compound represented by formula (B), but it is necessary to further increase the response speed and further research the requirement for high $\Delta n$.

A liquid crystal composition containing a compound represented by formula (C) and a compound represented by formula (D), which are substituted for the compound represented by the formula (A) in the liquid crystal composition described above, is disclosed (refer to Patent Literature 2).

[Chem. 2]

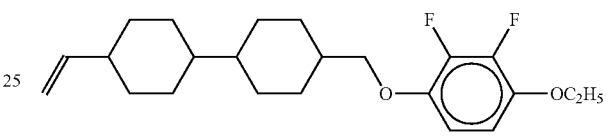
(C)

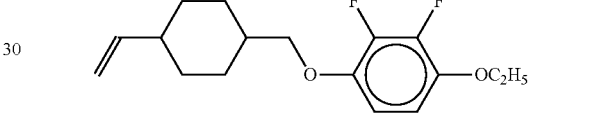
(D)

Also, the liquid crystal composition is in a situation where the faster response is not satisfactorily achieved, and satisfactory improvement is not made in the need for high $\Delta n$.

On the other hand, a liquid crystal composition (refer to Patent Literature 3) including a combination of a compound represented by formula (E) and a compound represented by formula (F), which both have negative $\Delta\in$, and a compound having substantially zero $\Delta\in$ and represented by formula (I) is disclosed. However, this liquid crystal composition does not contain an alkenyl compound and thus has high viscosity and cannot satisfy the requirement for faster response. Also, in a process for manufacturing a liquid crystal display device, the compound represented by formula (I) having low vapor pressure is evaporated due to very low pressure when the liquid crystal composition is injected into a liquid crystal cell, and it is thus considered that the content of the compound cannot be increased. In addition, the upper limit temperature of a liquid crystal phase is decreased by adding the compound represented by formula (I), and thus the content of the compound represented by formula (I) in the liquid crystal composition is limited to only 2%, thereby causing the problem of very high viscosity while exhibiting large $\Delta n$. Therefore, it is demanded to satisfy both high $\Delta n$ and low viscosity.

[Chem. 3]

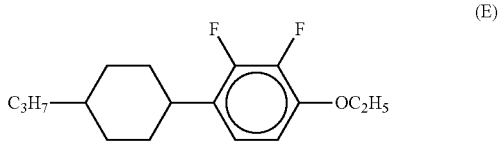
(E)

-continued

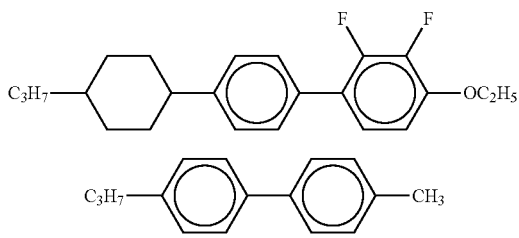

CITATION LIST

Patent Literature

PTL 1: Japanese Unexamined Patent Application Publication No. 2006-037054
PTL 2: Japanese Unexamined Patent Application Publication No. 2006-233182
PTL 3: WO2007/077872

SUMMARY OF INVENTION

Technical Problem

A problem to be solved by the invention is to provide a liquid crystal composition having satisfactorily low η and a large absolute value of negative ΔЄ without decreasing Δn and $T_{ni}$, and further provide a liquid crystal display device of a VA mode or the like which uses the liquid crystal composition and which causes no display defect or suppresses display defects.

Solution to Problem

As a result of research on various biphenyl derivatives and fluorobenzene derivatives, the inventors found that the problem can be solved by combining specified compounds, leading to the achievement of the present invention.

The present invention provides a liquid crystal composition containing as a first component a compound represented by formula (I), and,

[Chem. 4]

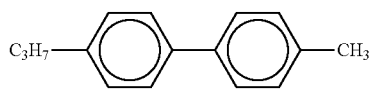

as a second component at least one compound selected from compounds represented by general formula (II),

[Chem. 5]

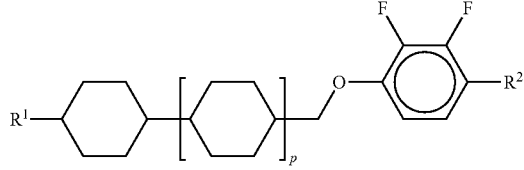

(wherein $R^1$ represents an alkenyl group having 2 to 10 carbon atoms or an alkenyloxy group having 2 to 10 carbon atoms, $R^2$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one —CH$_2$— or nonadjacent two or more —CH$_2$— present in $R^1$ and $R^2$ may be independently substituted by —O— and/or —S—, one or two or more hydrogen atoms present in $R^1$ and $R^2$ may be independently substituted by a fluorine atom or a chlorine atom, and p represents 0, 1, or 2), also provides a liquid crystal display device using the liquid crystal composition.

Advantageous Effects of Invention

A liquid crystal composition having negative ΔЄ according to the present invention has satisfactorily low viscosity without decreasing Δn and $T_{ni}$, and thus a liquid crystal display device of a VA mode or the like using the liquid crystal composition has fast response and causes no display defect or suppresses display defects, and is thus very useful.

DESCRIPTION OF EMBODIMENTS

In the present invention, a liquid crystal composition contains as a first component a compound represented by formula (I),

[Chem. 6]

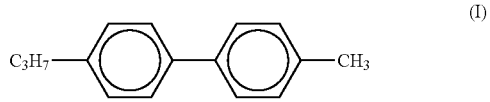

and the content thereof is preferably 3 to 25% by mass, and the lower limit thereof is preferably 5% by mass, more preferably 8% by mass, and particularly preferably 10% by mass, and the upper limit thereof is preferably 20% by mass, more preferably 18% by mass, and particularly preferably 15% by mass. In further detail, when high Δn and response speed are regarded as important, the content is preferably 10% to 25% by mass, while when suppression of precipitation at a low temperature and a decrease in the upper limit temperature of a liquid crystal phase are regarded as important, the content is preferably 3% to 15% by mass.

The liquid crystal composition contains as a second component a compound represented by general formula (II),

[Chem. 7]

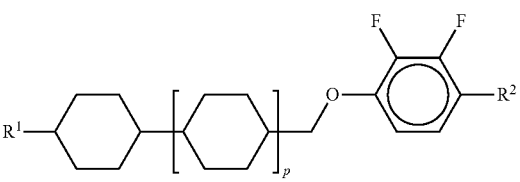

(wherein $R^1$ represents an alkenyl group having 2 to 10 carbon atoms or an alkenyloxy group having 2 to 10 carbon atoms, $R^2$ represents an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms, one —CH$_2$— or nonadjacent two or more —CH$_2$— present in R$^1$ and R$^2$ may be independently substituted by —O— and/or —S—, one or two or more hydrogen atoms present in R$^1$ and R$^2$ may be independently substituted by a fluorine atom or a chlorine atom, and p represents 0, 1, or 2), and the content thereof is preferably 10% to 50% by mass, more preferably 10% to 40% by mass, and particularly preferably 10% to 30% by mass. In addition, R$^1$ is preferably a linear alkenyl group having 2 to 8 carbon atoms, for example, —CH=CH$_2$, —CH=CHCH$_3$ (E isomer), —(CH$_2$)$_2$CH=CH$_2$, —(CH$_2$)$_2$CH=CHCH$_3$ (E isomer), —(CH$_2$)$_4$CH=CH$_2$, —(CH$_2$)$_4$CH=CHCH$_3$ (E isomer), or —(CH$_2$)$_6$CH=CH$_2$ is preferred, —CH=CH$_2$, —CH=CHCH$_3$ (E isomer), —(CH$_2$)$_2$CH=CH$_2$, or —(CH$_2$)$_2$CH=CHCH$_3$ (E isomer), and —CH=CH$_2$ is particularly preferred. Further, p is preferably 0 or 1. R$^2$ is preferably a linear alkyl group having 1 to 8 carbon atoms or a linear alkoxyl group having 1 to 8 carbon atoms, and more preferably a linear alkoxyl group having 1 to 5 carbon atoms.

The compound represented by the general formula (II) is particularly preferably a compound represented by general formula (II-1) or a compound represented by general formula (II-2),

[Chem. 8]

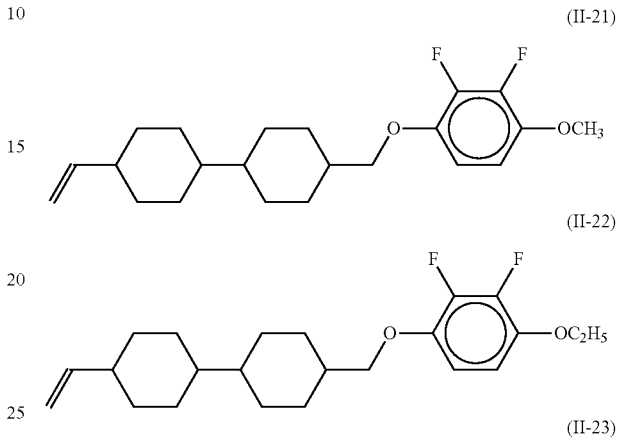

(R$^5$ represents an alkyl group having 1 to 10 carbon atoms).

In the formulae, R$^5$ represents a linear alkyl group having 1 to 10 carbon atoms, but is more preferably a linear alkyl group having 1 to 5 carbon atoms.

The liquid crystal composition of the present invention contains at least one compound as the second component, but preferably contains 2 to 10 compounds. When the liquid crystal composition contains two or more compounds as the second component, the content of each of the compounds is preferably 20% by mass or less and more preferably 10% by mass or less.

The liquid crystal composition of the present invention has preferably a Δ∈ at 25° C. of −2.0 to −6.0, more preferably −2.5 to −5.0, and particularly preferably −2.5 to −3.5. In addition, Δn at 25° C. is preferably 0.08 to 0.14, more preferably 0.09 to 0.14, and particularly preferably 0.10 to 0.14. In further detail, in correspondence to a thin cell gap, Δn at 25° C. is preferably 0.10 to 0.14, while in correspondence to a thick cell gap, Δn at 25° C. is preferably 0.08 to 0.10. Further, η at 20° C. is preferably 10 to 30 mPa·s, more preferably 10 to 25 mPa·s, and particularly preferably 10 to 20 mPa·s, and T$_{ni}$ is preferably 60° C. to 120° C., more preferably 70° C. to 100° C., and particularly preferably 70° C. to 85° C.

The compound represented by the general formula (II) is preferably a compound represented by general formula (II-1) or (II-2), and particularly preferably a compound represented by general formula (II-2). Specifically, compounds represented by formula (II-21) to formula (II-25) are particularly preferred.

[Chem. 9]

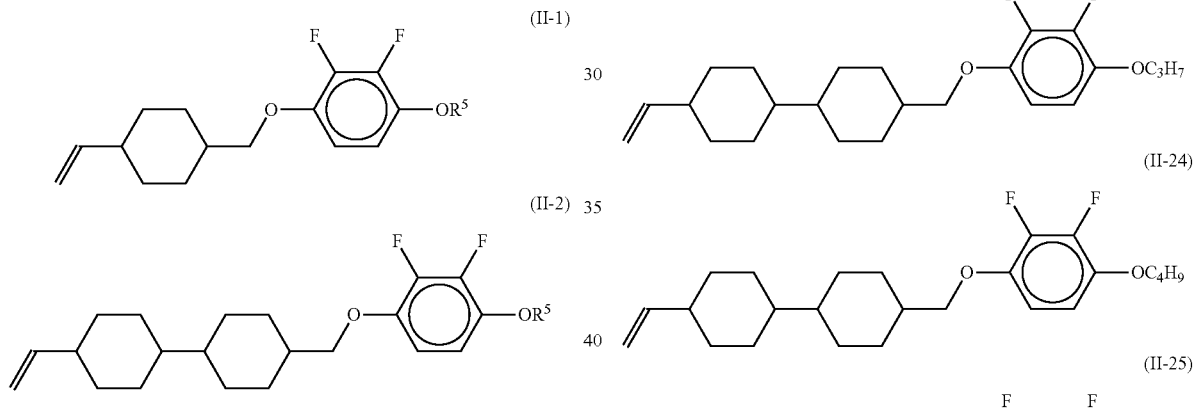

The liquid crystal composition of the present invention further contains as a third component at least one compound represented by general formula (III),

[Chem. 10]

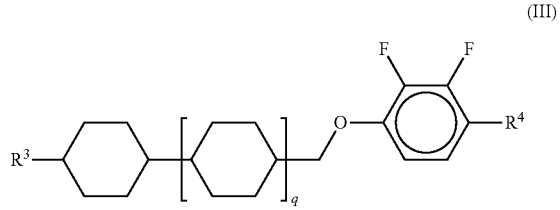

(wherein R$^3$ represents an alkyl group having 1 to 10 carbon atoms or an alkoxyl group having 1 to 10 carbon atoms, R$^4$ represents an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms, one —CH$_2$— or nonadjacent two or more —CH$_2$— present in R$^3$ and R$^4$ may be independently substituted by —O— and/or —S—, one or two or more hydrogen atoms present in R$^1$ and R$^2$ may be independently substituted by a fluorine atom or a chlorine atom, and q represents 0, 1, or 2). The content is preferably 5% to 50% by mass, more preferably 10% to 40% by mass, and particularly preferably 10% to 30% by mass.

R$^3$ is preferably a linear alkyl group having 1 to 8 carbon atoms or a linear alkyl group having 1 to 5 carbon atmos. R$^4$ is preferably a linear alkyl group having 1 to 8 carbon atoms or a linear alkoxyl group having 1 to 8 carbon atoms, and more preferably a linear alkoxyl group having 1 to 5 carbon atoms. In addition, q is preferably 0 or 1.

More specifically, a compound represented by general formula (III-1) or general formula (III-2) is more preferred,

[Chem. 11]

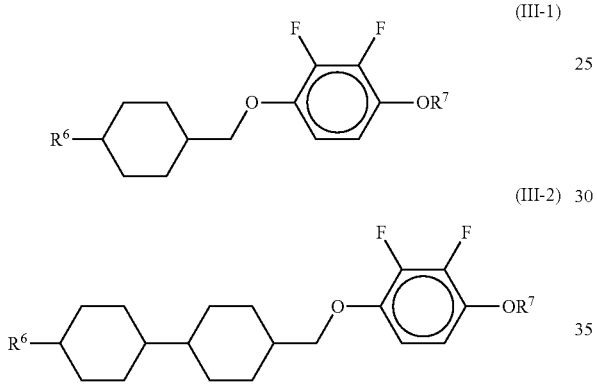

(R$^6$ or R$^7$ represents an alkyl group having 1 to 10 carbon atoms). In the formulae, R$^6$ or R$^7$ represents a linear alkyl group having 1 to 10 carbon atoms, but is more preferably a linear alkyl group having 1 to 5 carbon atoms.

The liquid crystal composition of the present invention contains at least one compound as the third component, but preferably contains 2 to 10 compounds. When the liquid crystal composition contains two or more compounds as the third component, the content of each of the compounds is preferably 20% by mass or less and more preferably 10% by mass or less.

The liquid crystal composition may contain as another component at least one compound selected from a compound group represented by general formulae (IV-1) to (IV-10), and

[Chem. 12]

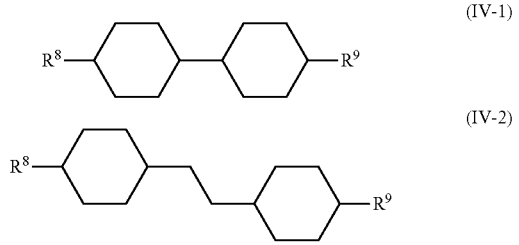

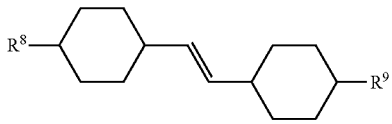

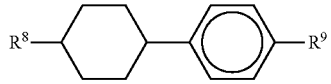

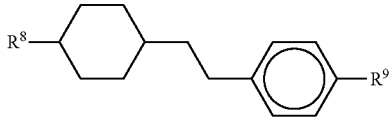

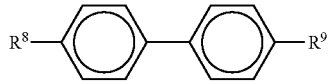

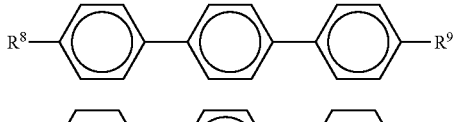

more preferably contains 2 to 10 compounds selected from compounds represented by the general formulae (IV-1), (IV-4), (IV-6), (IV-7), and (IV-8). In addition, R$^8$ represents an alkyl group having 1 to 5 carbon atoms or an alkenyl group having 2 to 5 carbon atoms, and R$^9$ represents an alkyl group having 1 to 5 carbon atoms, an alkoxyl group having 1 to 5 carbon atoms, an alkenyl group having 2 to 5 carbon atoms, or an alkenyloxy group having 2 to 5 carbon atoms, but R$^8$ is more preferably an alkyl group having 1 to 5 carbon atoms, and R$^9$ is more preferably an alkyl group having 1 to 5 carbon atoms or an alkoxyl group having 1 to 5 carbon atoms. The general formula (IV-6) in which R$^8$ represents a methyl group and R$^9$ represents a propyl group or R$^8$ represents a propyl group and R$^9$ represents a methyl group represents the same compound as that represented by the formula (I). Therefore, compounds represented by the general formula (IV-6) do not include a compound in which R$^8$ represents a methyl group and R$^9$ represents a propyl group or R$^8$ represents a propyl group and R$^9$ represents a methyl group.

The liquid crystal composition of the present invention has an effect achieved by combining compounds represented by the formula (I) and the general formula (II), but a combination of a compound represented by the formula (I) and a compound represented by the general formula (II-1) and/or the general formula (II-2) is more preferred, and a combination of a compound represented by the formula (I) and a compound represented by the general formula (II-2) is particularly preferred.

When the liquid crystal composition further contains a compound represented by the general formula (III), a combination of a compound represented by the formula (I), a compound represented by the general formula (II-1) and/or the general formula (II-2), and a compound represented by the general formula (II-1) and/or the general formula (III-2) is more preferred, a combination of a compound represented by the formula (I), a compound represented by the general formula (II-2), and a compound represented by the general formula (III-1) or a combination of a compound represented by the formula (I), a compound represented by the general formula (II-2), and a compound represented by the general formula (III-2) is more preferred, and a combination of a compound represented by the formula (I), a compound represented by the general formula (II-2), and compounds represented by the general formula (III-1) and the general formula (III-2) is particularly preferred.

Besides the above-described compounds, the liquid crystal composition of the present invention may further contain a usual nematic liquid crystal, smectic liquid crystal, cholesteric liquid crystal, antioxidant, ultraviolet absorber, and polymerizable monomer.

For example, a polymerizable compound such as a biphenyl derivative, a terphenyl derivative, or the like is contained as the polymerizable monomer, and the content thereof is preferably 0.01% by mass to 2% by mass. In further detail, the liquid crystal composition of the present invention may contain at least one polymerizable monomer represented by general formula (V),

[Chem. 13]

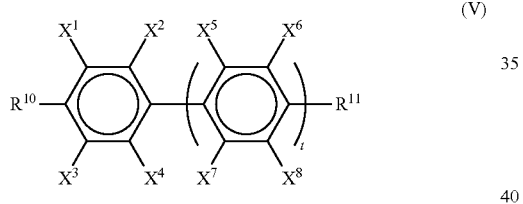

(V)

(wherein $R^{10}$ and $R^{11}$ each independently represent any one of formula (R-1) to formula (R-15) below,

[Chem. 14]

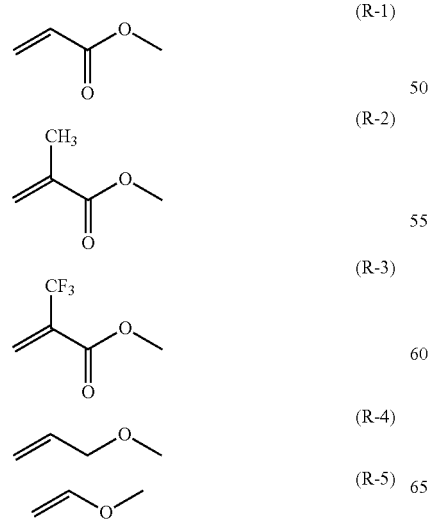

t represents 1 or 2, $X^1$ to $X^8$ each independently represent a trifluoromethyl group, a trifluoromethoxy group, a fluorine atom, or a hydrogen atom, and when t represents 2, a plurality of each of $X^5$ to $X^8$ may be the same or different).

In a compound represented by the general formula (V), $R^{10}$ and $R^{11}$ may be the same or different, and a substituent represented by the formula (R-1) or the formula (R-2) is preferred. In addition, t is preferably 1, a biphenyl skeleton in the general formula (V) more preferably has a structure represented by formula (V-11) to formula (V-14) and particularly preferably a structure represented by formula (V-11).

[Chem. 15]

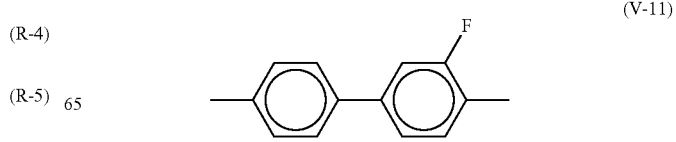

(V-11)

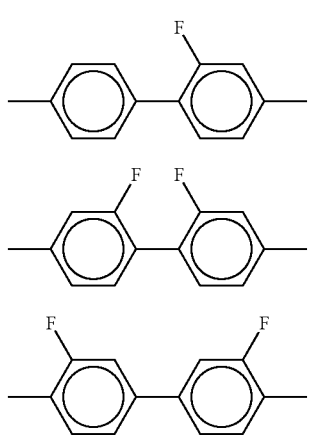

A polymerizable compound having a skeleton represented by the formula (V-11) to formula (V-14) has optimum alignment regulating force after polymerization and causes a good alignment state.

For example, with a liquid crystal composition containing a polymerizable compound, which simultaneously contains a compound represented by the formula (I), a compound represented by the general formula (II), and a compound represented by the general formula (V), high Δn and low viscosity can be achieved, and in a PSA-mode or PSVA-mode liquid crystal display device using the liquid crystal composition, fast response can be realized by a narrow gap corresponding to high Δn and the low viscosity of the liquid crystal composition, and the excellent effect of suppressing display unevenness or eliminating display unevenness is exhibited.

Also, the liquid crystal composition containing a liquid crystal compound having an acetylene group as a usual nematic liquid crystal or smectic liquid crystal has the effect of increasing Δn and useful for fast response, but causes a decrease in VHR, thereby inducing display failure. Therefore, it is necessary to use the liquid crystal compound depending on whether the response speed is regarded as important or reliability is regarded as important. In particular, when display failure is desired to be suppressed, it is important to decrease the content of the liquid crystal compound having an acetylene group or not to contain the liquid crystal compound. The content is preferably less than 10% by mass and more preferably less than 5% by mass, and the liquid crystal compound is particularly preferably not contained. The term "not contained" represents that the compound is not positively added and represents that impurities or the like which are inevitably contained during production are not contained. The impurity content is preferably 0.5% by mass or less, more preferably 0.1% by mass or less, and particularly preferably a measurement limit (about 10 ppm in gas chromatography measurement) or less.

In addition, a liquid crystal composition containing a chlorine group-containing liquid crystal compound is disclosed, but it significantly degrades reliability and causes display failure. Therefore, it is important to decrease the content of the chlorine group-containing liquid crystal compound or not to contain the compound. The content is preferably less than 10% by mass and more preferably less than 5% by mass, and the liquid crystal compound is particularly preferably not contained. The term "not contained" represents that the compound is not positively added and represents that impurities or the like which are inevitably contained during production are not contained. The impurity content is preferably 0.5% by mass or less, more preferably 0.1% by mass or less, and particularly preferably a measurement limit (about 10 ppm in gas chromatography measurement) or less.

A liquid crystal display device using the liquid crystal composition of the present invention satisfies both fast response and the suppression of display defects and is useful, and particularly useful for a liquid crystal display device for active matrix driving, and can be applied to a VA mode, a PSVA mode, a PSA mode, an IPS mode, or an ECB mode.

EXAMPLES

The present invention is described in further detail below by way of examples, but the present invention is not limited to these examples. In the examples and comparative examples below, "%" in a composition represents "% by mass".

The characteristics measured in the examples are as follows.

$T_{ni}$: nematic-isotropic liquid phase transition temperature (° C.)

Δn: refractive index anisotropy at 25° C.

Δ∈: dielectric anisotropy at 25° C.

η: viscosity at 20° C. (mPa·s)

Example 1

A liquid crystal composition prepared and the physical property values thereof are described below.

[Chem. 16]

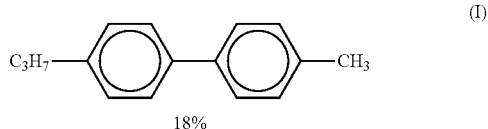

18%

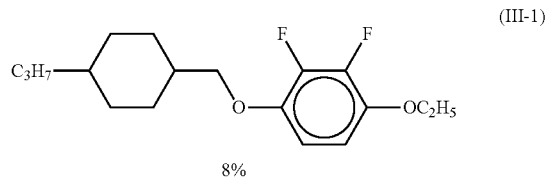

8%

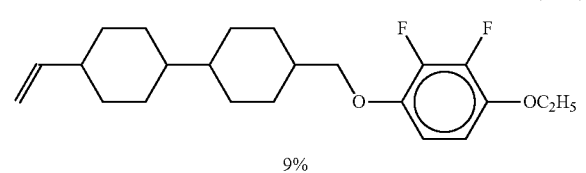

9%

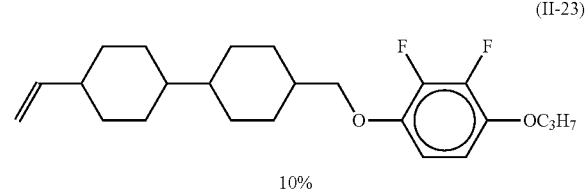

10%

-continued

C₃H₇—[Cy]—[Ph]—[Ph(F,F)]—OC₂H₅

7%

C₃H₇—[Cy]—[Ph]—[Ph(F,F)]—OC₃H₇

9%

C₅H₁₁—[Cy]—[Ph]—[Ph(F,F)]—OC₂H₅

6%

(IV-1)

C₃H₇—[Cy]—[Cy]—C₂H₅

18%

(IV-1)

C₃H₇—[Cy]—[Cy]—C₄H₉

8%

(IV-7)

C₃H₇—[Cy]—[Cy]—[Ph]—CH₃

7%

The physical property values of a nematic liquid crystal composition shown in Example 1 were as follows: $T_{ni}$: 73.3° C., $\Delta n$: 0.109, $\Delta\epsilon$: −2.9, and $\eta$: 15.5 mPa·sec. Further, measurement of a voltage holding ratio (VHR) confirmed that the liquid crystal composition has high VHR. In addition, a cell thickness was 3.5 μm, JALS2096 was used as an alignment film, and the response speed was measured by using DMS301 of AUTRONIC-MELCHERS Corporation under the conditions including Von of 5.5 V, Voff of 1.0 V, and a measurement temperature of 20° C. Further, VHR was measured by using VHR-1 of TOYO Corporation under the conditions including a voltage of 5 V, a frequency of 60 Hz, a temperature of 60° C.

Also, even when the conditions (pressure and ODF method) for injection into a liquid crystal cell were changed, no change was observed in the physical property values.

Comparative Example 1

A liquid crystal composition prepared and the physical property values thereof are described below.

[Chem. 17]

(I)

C₃H₇—[Ph]—[Ph]—CH₃

11%

-continued (III-1)

C₃H₇—[Cy]—CH₂O—[Ph(F,F)]—OC₂H₅

8%

(III-2)

C₃H₇—[Cy]—[Cy]—CH₂O—[Ph(F,F)]—OCH₃

9%

(III-2)

C₃H₇—[Cy]—[Cy]—CH₂O—[Ph(F,F)]—OC₂H₅

10%

C₃H₇—[Cy]—[Ph]—[Ph(F,F)]—OC₂H₅

7%

C₃H₇—[Cy]—[Ph]—[Ph(F,F)]—OC₃H₇

9%

C₅H₁₁—[Cy]—[Ph]—[Ph(F,F)]—OC₂H₅

6%

(IV-1)

C₃H₇—[Cy]—[Cy]—C₂H₅

18%

(IV-1)

C₃H₇—[Cy]—[Cy]—C₄H₉

18%

(IV-6)

C₅H₁₁—[Ph]—[Ph]—CH₃

7%

-continued

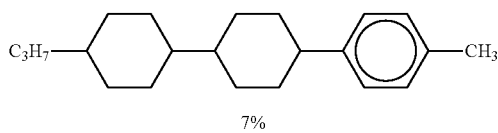
(IV-7)

7%

A nematic liquid crystal composition shown in Comparative Example 1 was Example 1 of PX100426, and the physical property values thereof were as follows: $T_{ni}$: 75.5° C., Δn: 0.108, Δ∈: −3.0, and η: 16.3 mPa·sec. Further, measurement of a voltage holding ratio (VHR) confirmed that the liquid crystal composition has high VHR. In addition, a cell thickness was 3.5 μm, JALS2096 was used as an alignment film, and the response speed was measured by using DMS301 of AUTRONIC-MELCHERS Corporation under the conditions including Von of 5.5 V, Voff of 1.0 V, and a measurement temperature of 20° C. Further, VHR was measured by using VHR-1 of TOYO Corporation under the conditions including a voltage of 5 V, a frequency of 60 Hz, a temperature of 60° C.

Also, even when the conditions (pressure and ODF method) for injection into a liquid crystal cell were changed, no change was observed in the physical property values.

Comparative Example 2

A liquid crystal composition prepared and the physical property values thereof are described below.

[Chem. 18]

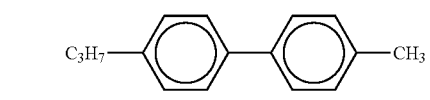
(I)

18%

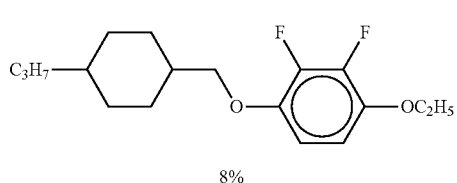
(III-1)

8%

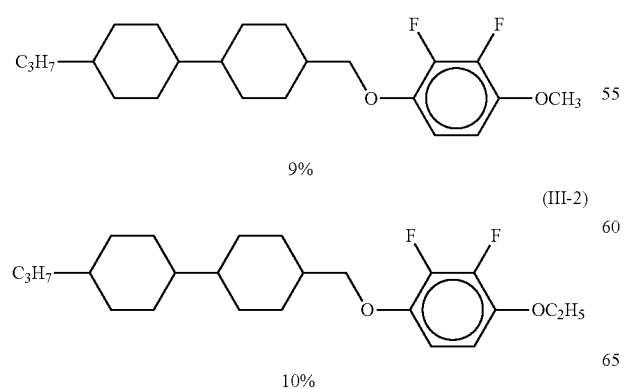
(III-2)

9%

(III-2)

10%

-continued

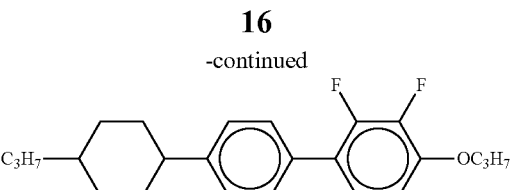

7%

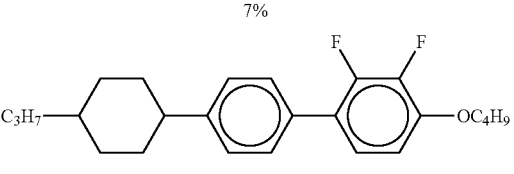

9%

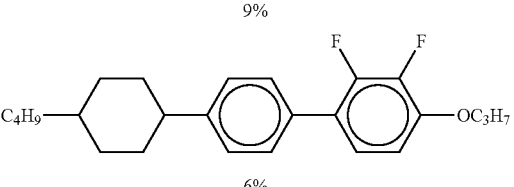

6%

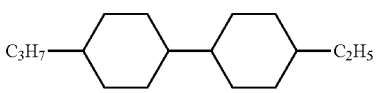
(IV-1)

18%

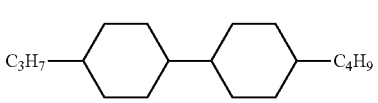
(IV-1)

8%

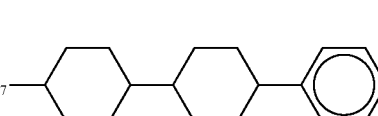
(IV-7)

7%

The physical property values of a nematic liquid crystal composition shown in Comparative Example 2 were as follows: $T_{ni}$: 75.2° C., Δn: 0.109, Δ∈: −2.9, and 16.6 mPa·s.

Comparative Example 3

A liquid crystal composition prepared and the physical property values thereof are described below.

[Chem. 19]

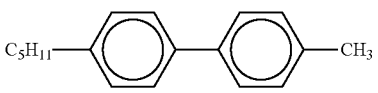
(IV-6)

18%

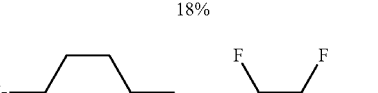
(III-1)

8%

-continued
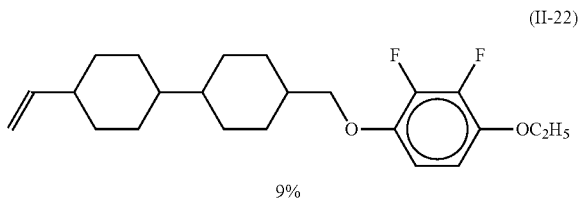
(II-22)
9%
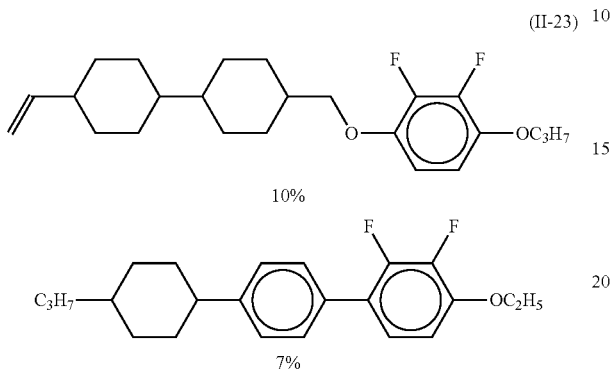
(II-23)
10%
7%
9%
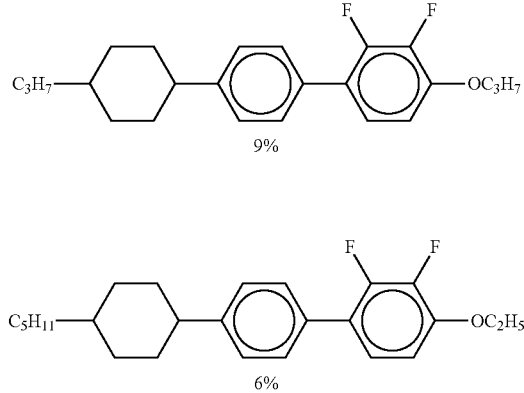
6%
(IV-1)
18%
(IV-1)
8%
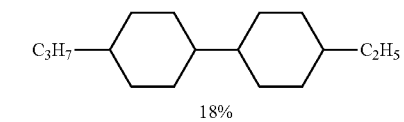
(IV-7)
7%
The physical property values of a nematic liquid crystal composition shown in Comparative Example 3 were as follows: $T_{ni}$: 75.6° C., Δn: 0.108, Δ∈: −2.9, and 17.6 mPa·s.
Comparative Example 4
A liquid crystal composition prepared and the physical property values thereof are described below.
[Chem. 20]
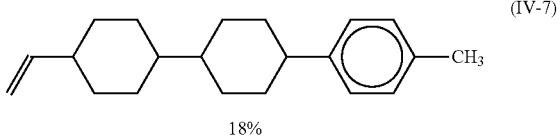
(IV-7)
18%
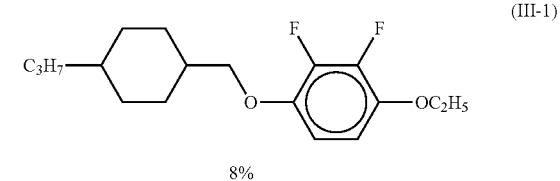
(III-1)
8%
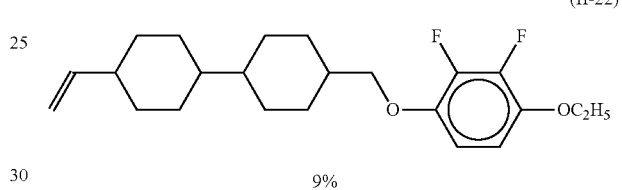
(II-22)
9%
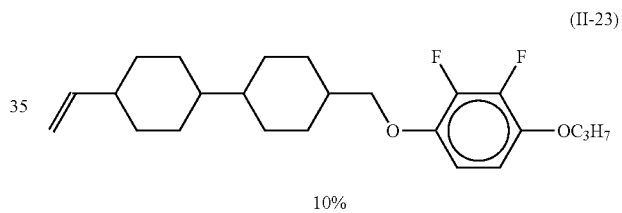
(II-23)
10%
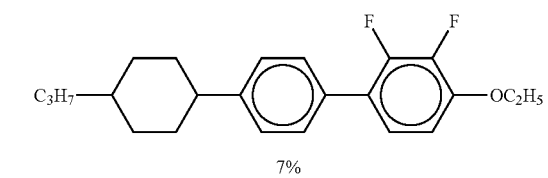
7%
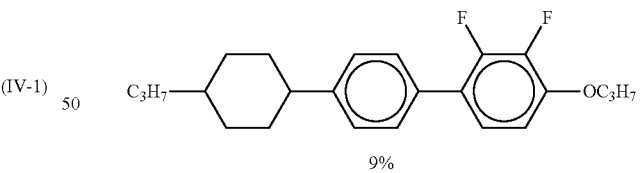
9%
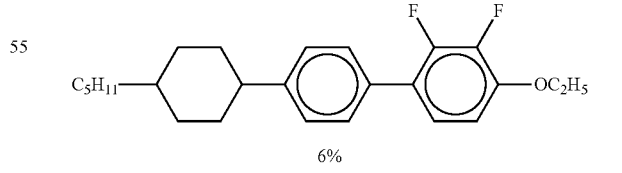
6%
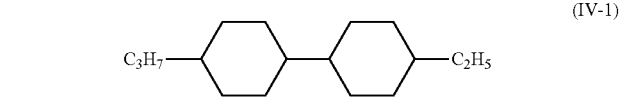
(IV-1)
18%

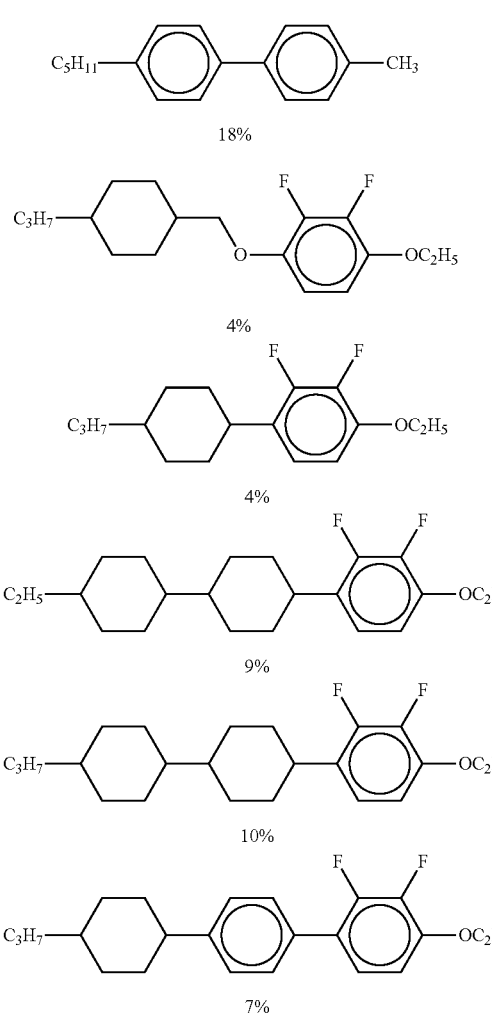

(IV-1)

8%

(IV-7)

7%

The physical property values of a nematic liquid crystal composition shown in Comparative Example 4 were as follows: $T_{ni}$: 107.6° C., $\Delta n$: 0.098, $\Delta\varepsilon$: −3.2, and 23.3 mPa·s. It was found that $\eta$ is very large, and Example 1 is excellent.

Comparative Example 5

A liquid crystal composition prepared and the physical property values thereof are described below.

[Chem. 21]

(IV-6)

18%

(III-1)

4%

4%

9%

10%

7%

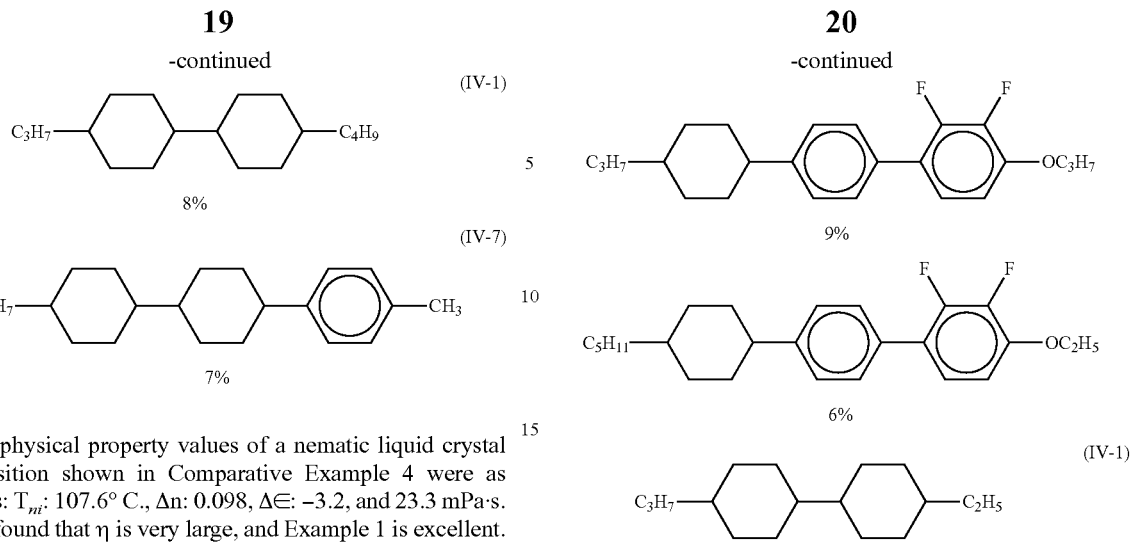

(IV-1)

9%

6%

(IV-1)

18%

(IV-1)

8%

(IV-7)

7%

The physical property values of a nematic liquid crystal composition shown in Comparative Example 5 were as follows: $T_{ni}$: 77.2° C., $\Delta n$: 0.110, $\Delta\varepsilon$: −2.4, and $\eta$: 16.2 mPa·s. it was found that an absolute value of $\Delta\varepsilon$ is small, and Example 1 is excellent.

Example 2

A liquid crystal composition prepared and the physical property values thereof are described below.

[Chem. 22]

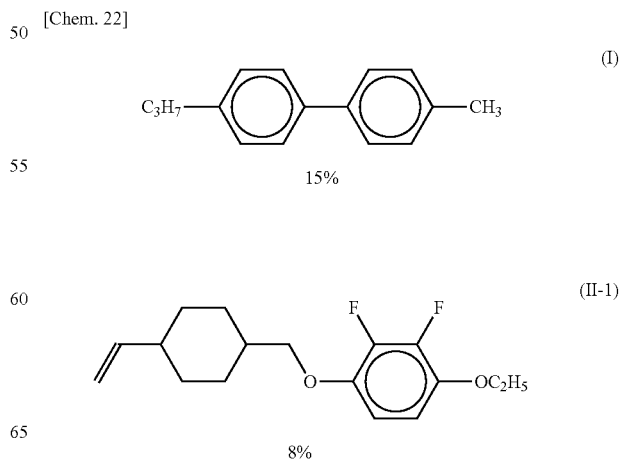

(I)

15%

(II-1)

8%

-continued
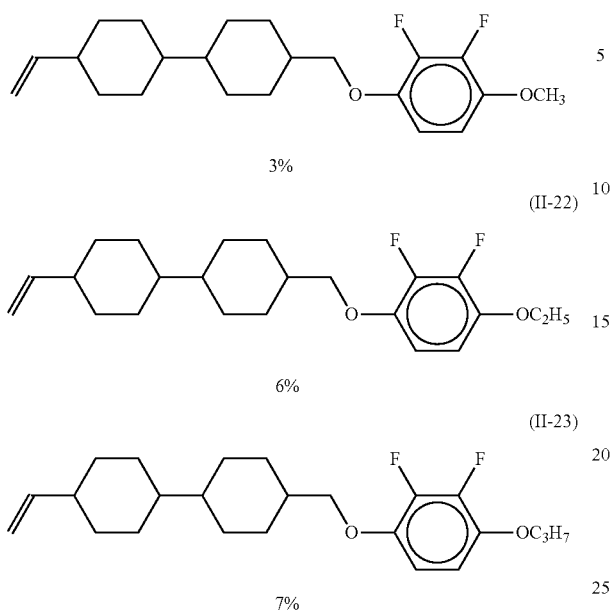
(II-21) 3%
(II-22) 6%
(II-23) 7%
(II-24) 3%
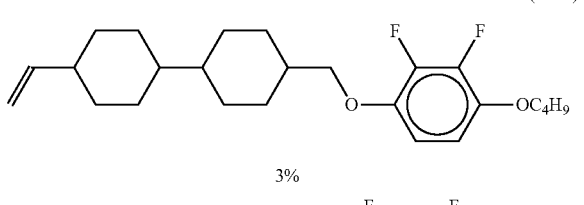
7%
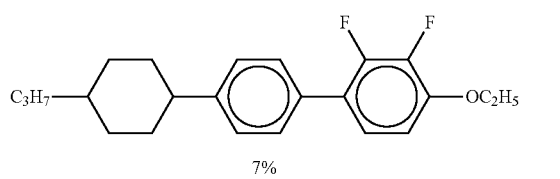
9%
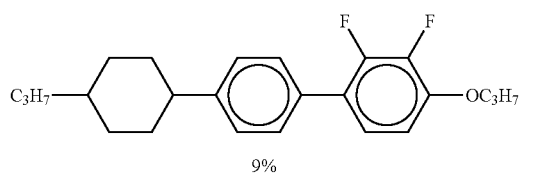
6%
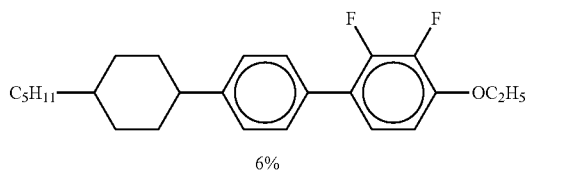
(IV-1) 18%
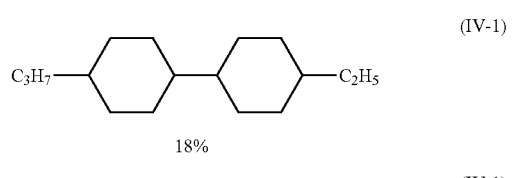
(IV-1) 8%
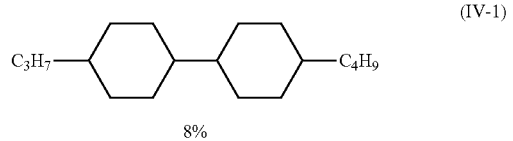
-continued
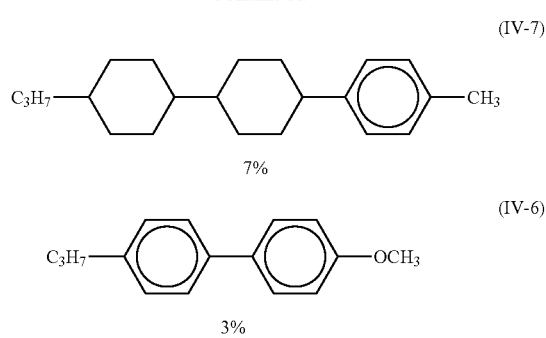
(IV-7) 7%
(IV-6) 3%
The physical property values of a nematic liquid crystal composition shown in Example 2 were as follows: $T_{ni}$: 75.3° C., $\Delta n$: 0.109, $\Delta \epsilon$: −3.1, and $\eta$: 15.9 mPa·s.
Example 3
A liquid crystal composition prepared and the physical property values thereof are described below.
[Chem. 23]
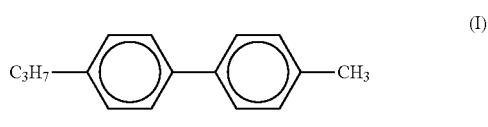
(I) 11%
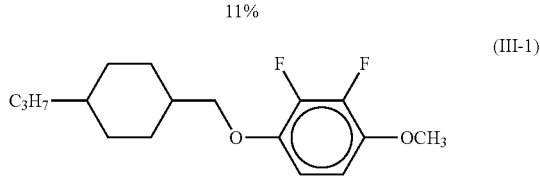
(III-1) 4%
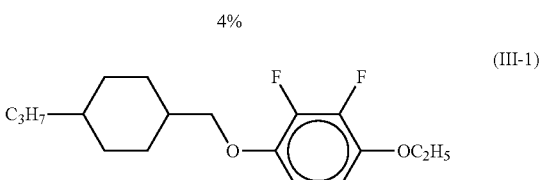
(III-1) 4%
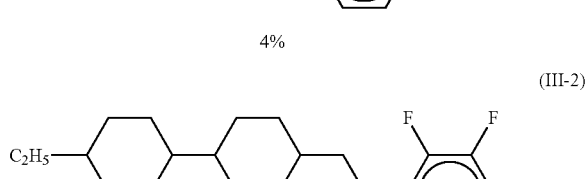
(III-2) 9%
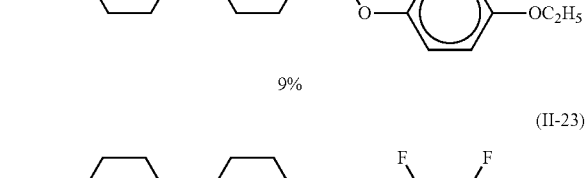
(II-23) 10%
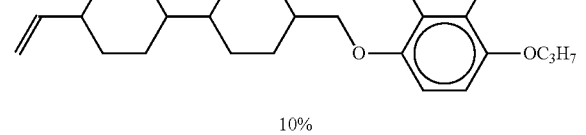

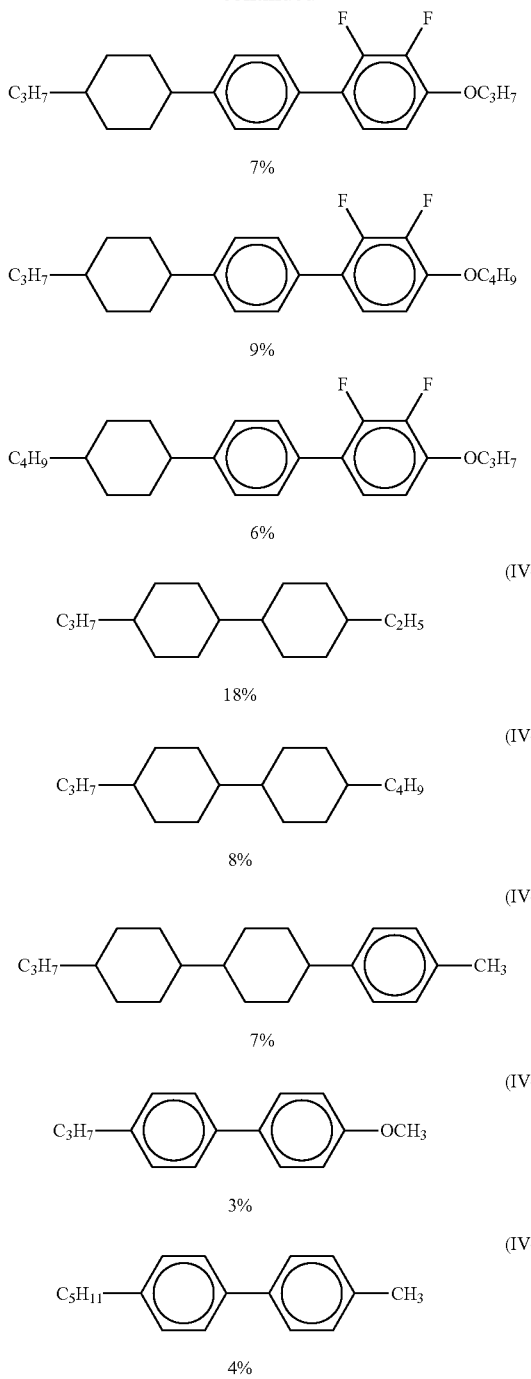

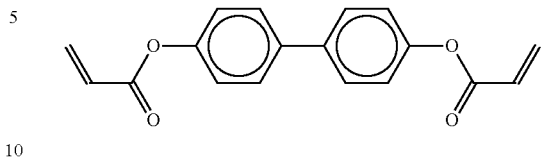

(IV-a)

The physical properties of CLC-1 were substantially the same as those of the nematic liquid crystal composition shown in Example 1. The CLC-1 was injected, by a vacuum injection method, into a cell provided with ITO and having a cell gap of 3.5 μm and a polyimide alignment film applied for inducing homeotropic alignment. A pre-tilt angle (crystal rotation method) of the cell was measured, and then the liquid crystal cell was irradiated with ultraviolet light from a high-pressure mercury lamp through a filter which cut off ultraviolet light of 320 nm or less, while a rectangular wave with a frequency of 1 kHz and 1.8 V was applied. The polymerizable compound in the polymerizable liquid crystal composition was polymerized by ultraviolet irradiation for 600 seconds so that the irradiation intensity on a surface of the cell was adjusted to 10 mW/cm², thereby producing a vertical alignment liquid crystal display device. It was confirmed that an alignment regulating force is exerted on the liquid crystal compound by polymerizing the polymerizable compound. Also, it was confirmed that the vertical alignment liquid crystal display device has excellent optical properties and fast response.

Example 5

A polymerizable liquid crystal composition CLC-2 was prepared by adding and uniformly dissolving 0.3% of a polymerizable compound represented by formula (IV-b) to 99.7% of the nematic liquid crystal composition shown in Example 1.

[Chem. 25]

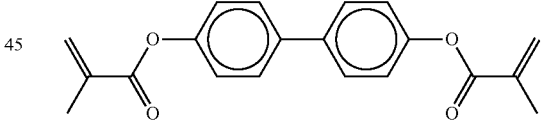

(IV-b)

The physical properties of CLC-2 were substantially the same as those of the nematic liquid crystal composition shown in Example 1. The CLC-2 was injected, by a vacuum injection method, into a cell provided with ITO and having a cell gap of 3.5 μm and a polyimide alignment film applied for inducing homeotropic alignment. A pre-tilt angle (crystal rotation method) of the cell was measured, and then the liquid crystal cell was irradiated with ultraviolet light from a high-pressure mercury lamp through a filter which cut off ultraviolet light of 320 nm or less, while a rectangular wave with a frequency of 1 kHz and 1.8 V was applied. The polymerizable compound in the polymerizable liquid crystal composition was polymerized by ultraviolet irradiation for 600 seconds so that the irradiation intensity on a surface of the cell was adjusted to 10 mW/cm², thereby producing a vertical alignment liquid crystal display device. It was confirmed that an alignment regulating force is exerted on the liquid crystal compound by polymerizing the polymer- The physical property values of a nematic liquid crystal composition shown in Example 3 were as follows: $T_{ni}$: 75.8° C., Δn: 0.109, Δ∈: −3.0, and η: 15.7 mPa·s.

Example 4

A polymerizable liquid crystal composition CLC-1 was prepared by adding and uniformly dissolving 0.3% of a polymerizable compound represented by formula (IV-a) to 99.7% of the nematic liquid crystal composition shown in Example 1.

Example 6

A polymerizable liquid crystal composition CLC-3 was prepared by adding and uniformly dissolving 0.3% of a polymerizable compound represented by formula (IV-c) to 99.7% of the nematic liquid crystal composition shown in Example 1

[Chem. 26]

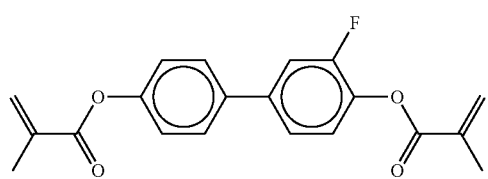

(IV-c)

The physical properties of CLC-3 were substantially the same as those of the nematic liquid crystal composition shown in Example 1. The CLC-3 was injected, by a vacuum injection method, into a cell provided with ITO and having a cell gap of 3.5 μm and a polyimide alignment film applied for inducing homeotropic alignment. A pre-tilt angle (crystal rotation method) of the cell was measured, and then the liquid crystal cell was irradiated with ultraviolet light from a high-pressure mercury lamp through a filter which cut off ultraviolet light of 320 nm or less, while a rectangular wave with a frequency of 1 kHz and 1.8 V was applied. The polymerizable compound in the polymerizable liquid crystal composition was polymerized by ultraviolet irradiation for 600 seconds so that the irradiation intensity on a surface of the cell was adjusted to 10 mW/cm$^2$, thereby producing a vertical alignment liquid crystal display device. It was confirmed that an alignment regulating force is exerted on the liquid crystal compound by polymerizing the polymerizable compound. Also, it was confirmed that the vertical alignment liquid crystal display device has excellent optical properties and fast response.

The invention claimed is:

1. A liquid crystal composition comprising, as a first component, 3 to 25% by mass of a compound represented by formula (I),

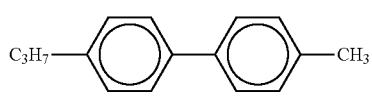

(I)

as a second component, 10 to 50% by mass of at least one compound selected from compounds represented by general formula (II),

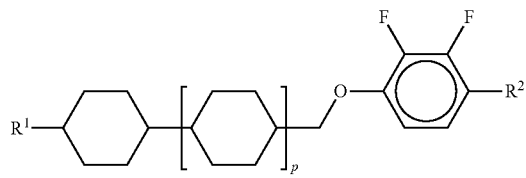

(II)

wherein R$^1$ represents an alkenyl group having 2 to 10 carbon atoms or an alkenyloxy group having 2 to 10 carbon atoms, R$^2$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one —CH$_2$— or nonadjacent two or more —CH$_2$— present in R$^1$ and R$^2$ may be independently substituted by —O— and/or —S—, one or two or more hydrogen atoms present in R$^1$ and R$^2$ may be independently substituted by a fluorine atom or a chlorine atom, and p represents 0;

20% by mass or more of each of at least one compound selected from a compound group represented by general formulae (IV-1) to (IV-10),

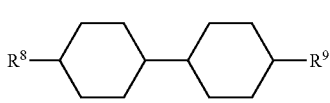

(IV-1)

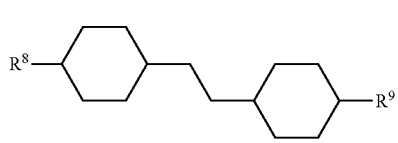

(IV-2)

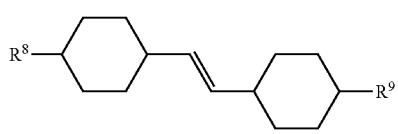

(IV-3)

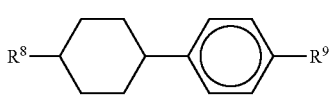

(IV-4)

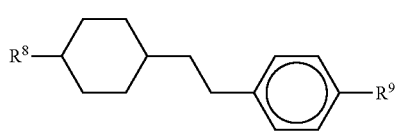

(IV-5)

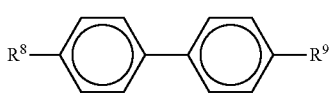

(IV-6)

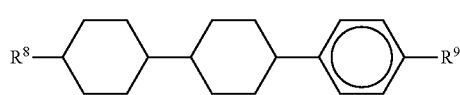

(IV-7)

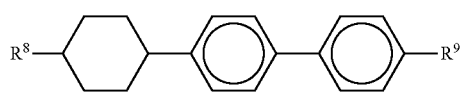

(IV-8)

-continued

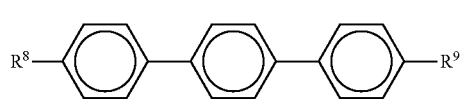 (IV-9)

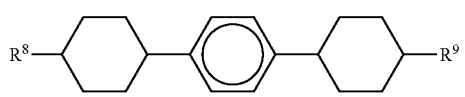 (IV-10)

wherein $R^8$ represents an alkyl group having 1 to 5 carbon atoms or an alkenyl group having 2 to 5 carbon atoms, and $R^9$ represents an alkyl group having 1 to 5 carbon atoms, an alkoxyl group having 1 to 5 carbon atoms, an alkenyl group having 2 to 5 carbon atoms, or an alkenyloxy group having 2 to 5 carbon atoms; and 0.01% by mass to 2% by mass of a polymerizable compound represented by general formula (V),

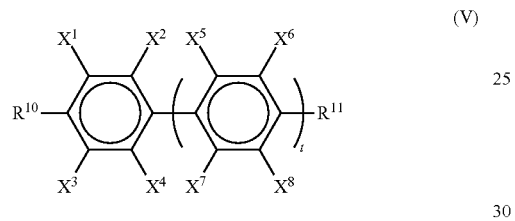 (V)

wherein $R^{10}$ and $R^{11}$ each independently represent any one of formula (R-1) to formula (R-15) below,

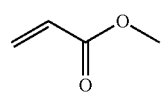 (R-1)

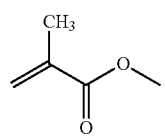 (R-2)

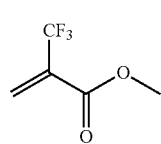 (R-3)

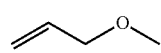 (R-4)

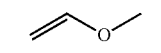 (R-5)

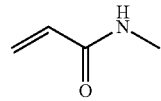 (R-6)

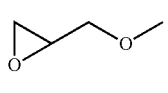 (R-7)

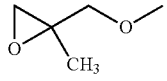 (R-8)

-continued

 (R-9)

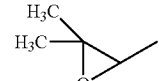 (R-10)

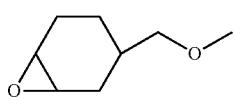 (R-11)

 (R-12)

 (R-13)

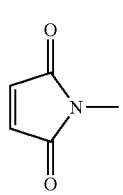 (R14)

HS— , (R-15)

t represents 1 or 2, $X^1$ to $X^8$ each independently represent a trifluoromethyl group, a trifluoromethoxy group, a fluorine atom, or a hydrogen atom, and when t represents 2, a plurality of each of $X^5$ to $X^8$ may be the same or different.

wherein Δε at 25° C. is within a range of -2.0 to -6.0, refractive index anisotropy (Δn) at 25° C. is within range of 0.08 to 0.14, viscosity (η) at 20° C. is within a range of 10 to 30 mPa•s, and a nematic-isotropic liquid phase transition temperature ($T_{ni}$) is within a range of 60° C. 120° C.

2. The liquid crystal composition according to claim 1, further comprising, as a third component, at least one compound represented by general formula (III),

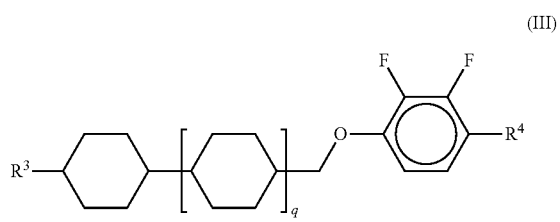 (III)

(wherein $R^3$ represents an alkyl group having 1 to 10 carbon atoms or an alkoxy group having 1 to 10 carbon atoms, $R^4$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one —CH₂— or nonadjacent two or more —CH₂— present in $R^3$ and $R^4$ may be independently substituted by —O— and/or —S—, one or two or more hydrogen atoms present in $R^3$ and $R^4$ may be independently substituted by a fluorine atom or a chlorine atom, and q represents 0, 1, or 2).

3. The liquid crystal composition according to claim 2, wherein a content of the third component is 5% to 50% by mass.

4. The liquid crystal composition according to claim 1, comprising, as the second component, at least one compound selected from compounds represented by general formula (II-1) and general formula (II-2),

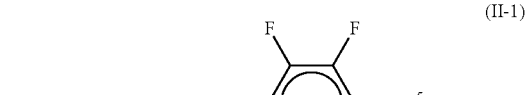
(II-1)

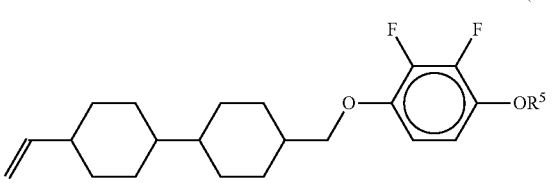
(II-2)

($R^5$ represents an alkyl group having 1 to 10 carbon atoms).

5. The liquid crystal composition according to claim 2, comprising, as the third component, at least one compound selected from compounds represented by general formula (III-1) and general formula (III-2),

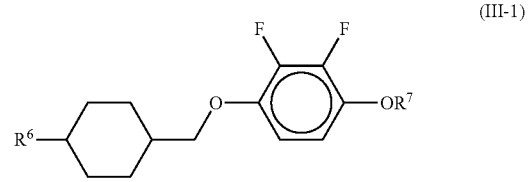
(III-1)

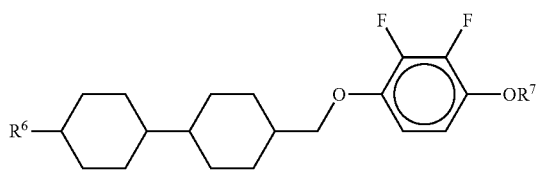
(III-2)

($R^6$ or $R^7$ represents an alkyl group having 1 to 10 carbon atoms).

6. The liquid crystal composition according to claim 5, comprising the compound represented by the formula (I), at least one compound represented by the general formula (II-2), and at least one compound represented by the general formula (III-1).

7. The liquid crystal composition according to claim 5, comprising the compound represented by the formula (I), at least one compound represented by the general formula (II-2), and at least one compound represented by the general formula (III-2).

8. The liquid crystal composition according to claim 5, comprising the compound represented by the formula (I), at least one compound represented by the general formula (II-2), at least one compound represented by the general formula (III-1), and at least one compound represented by the general formula (III-2).

9. The liquid crystal composition according to claim 1, wherein a content of a liquid crystal compound having an acetylene group is less than 10% by mass.

10. The liquid crystal composition according to claim 1, comprising a polymerizable compound.

11. A liquid crystal display device comprising the liquid crystal composition according to claim 1.

12. A liquid crystal display device for active matrix driving, comprising the liquid crystal composition according to claim 1.

13. A liquid crystal display device for a VA mode, a PSA mode, a PSVA mode, an IPS mode, or an ECB mode, comprising the liquid crystal composition according to claim 1.

* * * * *